United States Patent [19]
Fowler

[11] Patent Number: 6,119,394
[45] Date of Patent: Sep. 19, 2000

[54] REMOVABLE COVER FOR A FLOWER RECEPTACLE AT A GRAVE MARKER

[76] Inventor: Deborah A. Fowler, 6405 Meadow Rue Dr., Norcross, Ga. 30092

[21] Appl. No.: 09/055,623

[22] Filed: Apr. 6, 1998

[51] Int. Cl.[7] .................... A01G 5/00; A01G 13/00; A01G 13/04; A47G 7/00

[52] U.S. Cl. .................. 47/41.01; 47/41.14; 47/41.1; 47/28.1; 47/29

[58] Field of Search .................. 47/20, 21, 26, 47/28.1, 29, 30, 41.01, 41.1, 41.11, 41.12, 41.13, 41.14, 41.15

[56] References Cited

U.S. PATENT DOCUMENTS

| | | | |
|---|---|---|---|
| Re. 30,531 | 3/1981 | Spector | 47/69 |
| 84,445 | 11/1868 | Stigale | 47/41.01 |
| 632,321 | 9/1899 | Olney | 211/74 |
| 1,081,825 | 12/1913 | Glassco | 47/41.01 |
| 1,518,434 | 12/1924 | Klein | 43/126 |
| 1,897,382 | 2/1933 | Blair | 47/21 |
| 2,138,188 | 11/1938 | Morley | 47/29 |
| 2,496,522 | 2/1950 | Doggett et al. | 47/41.1 |
| 2,632,286 | 3/1953 | Newhall | 47/41.12 |
| 2,639,552 | 5/1953 | Tredup | 47/41.13 |
| 2,763,134 | 9/1956 | McDonald | 62/331 |
| 2,807,901 | 10/1957 | Gilowitz | 47/41.01 |
| 3,466,799 | 9/1969 | Stilson | 47/21 |
| 3,704,545 | 12/1972 | Van Reisen | 47/29 |
| 3,765,995 | 10/1973 | Perrin | 47/41.13 |
| 3,896,586 | 7/1975 | Caldwell | 47/28.1 |
| 3,995,396 | 12/1976 | Spector | 47/69 |
| 4,132,457 | 1/1979 | Parrish et al. | 312/284 |
| 4,221,078 | 9/1980 | Latham et al. | 47/41.01 |
| 4,340,075 | 7/1982 | Medeiros | 135/120.1 |
| 4,392,326 | 7/1983 | Boria | 47/28.1 |
| 4,621,733 | 11/1986 | Harris | 206/423 |
| 4,662,107 | 5/1987 | Van Den Kieboom | 206/423 |
| 4,706,411 | 11/1987 | Lovqvist | 47/30 |
| 4,791,754 | 12/1988 | Demars, Jr. | 47/29 |
| 4,811,841 | 3/1989 | Domenchiello | 206/423 |
| 4,941,572 | 7/1990 | Harris | 47/84 |
| 5,127,184 | 7/1992 | Cosentino | 47/41.01 |
| 5,575,109 | 11/1996 | Kuntz | 47/22 |

FOREIGN PATENT DOCUMENTS

| | | | |
|---|---|---|---|
| 2674419 | 10/1992 | France | 47/41.01 |
| 29675 | of 0000 | Germany | 47/41 |
| 2493 | of 1892 | United Kingdom | 47/41 |
| 3912 | of 1893 | United Kingdom | 47/41 |
| WO 87/07113 | 12/1987 | WIPO | 47/41.01 |

*Primary Examiner*—Michael J. Carone
*Assistant Examiner*—Fredrick T. French, III

[57] ABSTRACT

A removable protective cover for a flower receptacle at a grave marker includes a lower portion and an upper portion. The lower portion includes a generally tubular base member having open ends and a hole extending longitudinally therethrough. The base member also has a flange extending outwardly from its upper end. The lower open end of the base member is placed over the flower receptacle and lowered downwardly over the receptacle. The lower portion also includes a plate having an aperture in the center of the plate that is attached to the base member such that the aperture corresponds to the hole in the base member. The plate also has a plurality of slots provided around its periphery and an upturned lip extending upwardly from the periphery of the plate. The upper portion of the device includes a protective cover that can be removably connected to the plate to enclose and protect the flowers or other objects placed in the receptacle. The cover is preferably made of clear plastic and is parabolic or hemispherical in shape. A plurality of tabs extend from the bottom edge of the cover in positions corresponding to the positions of the slots in the plate. To removably connect the cover to the plate, the cover is lowered onto the plate such that the tabs extend through the respective slots in the plate. The lip on the outer edge of the plate helps to keep the cover in place by preventing lateral movement of the cover.

15 Claims, 2 Drawing Sheets

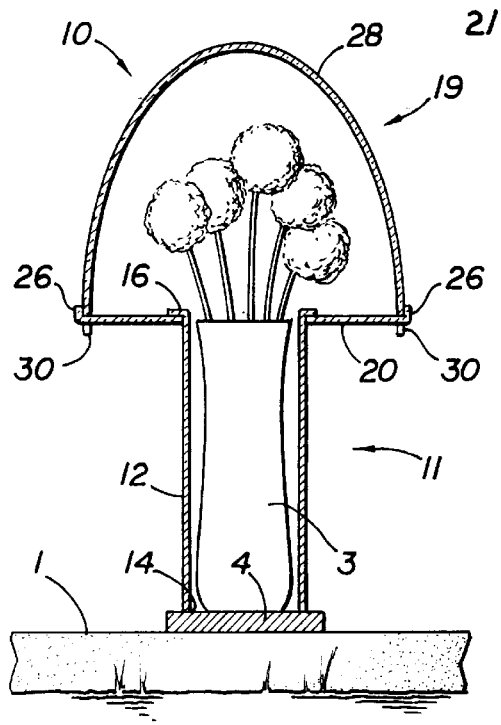
FIG 3
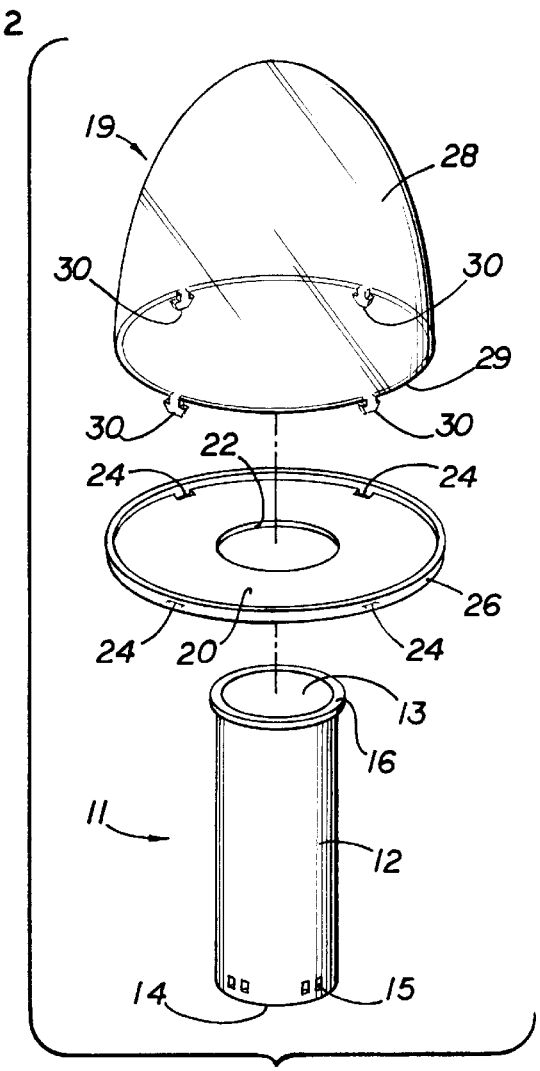
FIG 4
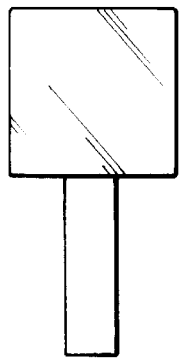 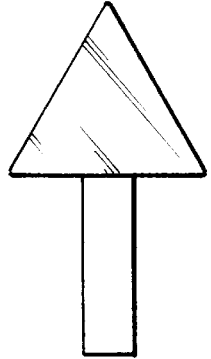 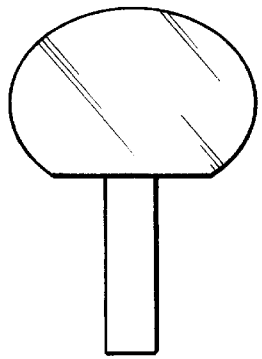 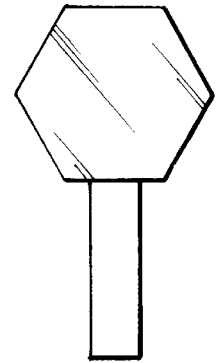
FIG 5A  FIG 5B  FIG 5C  FIG 5D

REMOVABLE COVER FOR A FLOWER RECEPTACLE AT A GRAVE MARKER

FIELD OF THE INVENTION

The present invention relates generally to grave markers and flower receptacles therefore and more particularly relates to a removable protective cover for a flower receptacle at a grave marker.

BACKGROUND OF THE INVENTION

In many cemeteries, graves are marked by grave markers, which are typically comprised of a flat stone or cement slab. Each marker usually has indicia such as the name of the person buried in the grave carved or etched into the marker, so as to identify the grave. A grave marker is not like a headstone, which extends upwardly several feet above the ground. Instead, a grave marker lies flat on the ground or is laid into the ground such that the top surface of the grave marker is flush with the ground.

As shown in FIG. 1, a grave marker 1 may have a receptacle, generally shown as reference numeral 2, attached thereto for holding flowers or other objects placed there by loved ones who visit the grave site. The receptacle need not be attached to the grave marker, but can also be a stand-alone device positioned near the grave marker. The receptacle is typically shaped like a vase with a tubular portion 3, into which stems of flowers can be inserted such that the blossoms, blooms, or buds of the flowers extend upwardly over the receptacle. The tubular portion 3 of the flower receptacle may extend upwardly from a bottom 4, which is connected to the grave marker.

Many cemeteries have floral regulations that define the types of objects that can be placed in the receptacles or left at a grave site. Although live cut flowers and artificial flowers are usually permitted at all times throughout the year, these floral arrangements are usually removed by cemetery personnel if then become discolored, wilted, or unsightly.

Unfortunately, flowers placed in the receptacle at a grave marker are unprotected from the elements. Consequently, the flowers placed in the receptacle are often damaged by wind, rain, sun, and other perils. The flowers can also be damaged by cemetery personnel who manage the cemetery grounds. For example, lawn mowing equipment and other maintenance equipment may inadvertently bump into the receptacles, thereby damaging or dislodging the flowers. The wind, which may blow strongly through a cemetery because of the lack of trees or buildings to block it, may damage the flowers or blow the flowers completely out of the receptacle. Similarly, rain and sunlight may damage the flowers or other objects in the receptacle. Such damage to the flowers in the receptacle is undesirable not only because it affects the aesthetics of the grave site, but also because replacing damaged flowers can be expensive and time-consuming considering the cost of new flowers and the time required to bring the new flowers to the grave site.

Therefore, there is a need in the art for a device that protects flowers or other objects placed in a receptacle at a grave marker from being damaged by wind, rain, and other perils associated with cemeteries, such as maintenance equipment.

SUMMARY OF THE INVENTION

The present invention is a removable protective cover for a flower receptacle at a grave marker. The invention includes a lower portion and an upper portion. The lower portion includes a generally tubular base member having open ends and a hole extending longitudinally therethrough. The base member also has a flange extending outwardly from its upper end. The lower open end of the base member is placed over the flower receptacle and lowered downwardly over the receptacle. The lower portion of the present invention also includes a plate having an aperture in the center of the plate. The plate is attached to the flange of the base member such that the aperture corresponds to the hole in the base member. The plate also has a plurality of slots provided around its periphery and an upturned lip extending upwardly from the periphery of the plate.

The upper portion of the present invention includes a protective cover that can be removably connected to the plate to enclose and protect the flowers or other objects placed in the receptacle. The cover is preferably made of clear plastic and is parabolic or hemispherical in shape. A plurality of tabs extend from the bottom edge of the cover. The tabs are located in positions corresponding to the positions of the slots in the plate. To removably connect the cover to the plate, the cover is lowered onto the plate such that the tabs extend through the respective slots in the plate. Also, when the cover is attached to the plate, the lip on the outer edge of the plate helps to keep the cover in place by preventing lateral movement of the cover.

BRIEF DESCRIPTION OF THE DRAWINGS

FIG. 3 is a cross-sectional view of the device of the present invention taken along line 3—3 of FIG. 2.

FIG. 4 is a perspective views of the components of the device of the present invention.

FIGS. 5A–D are side views of alternative embodiments of the device of the present invention showing different cover shapes.

DETAILED DESCRIPTION OF THE PREFERRED EMBODIMENTS

The present invention is a removable protective cover for a flower receptacle at a grave marker. For the purposes of this disclosure, the present invention will be described with reference to flowers being placed into the open end of the base member. However, the present invention is not limited merely to flowers being placed therein and it is contemplated that the present invention will be useful for protecting any object that is placed within the receptacle at the grave marker from wind, rain, and other perils.

Figure 1:
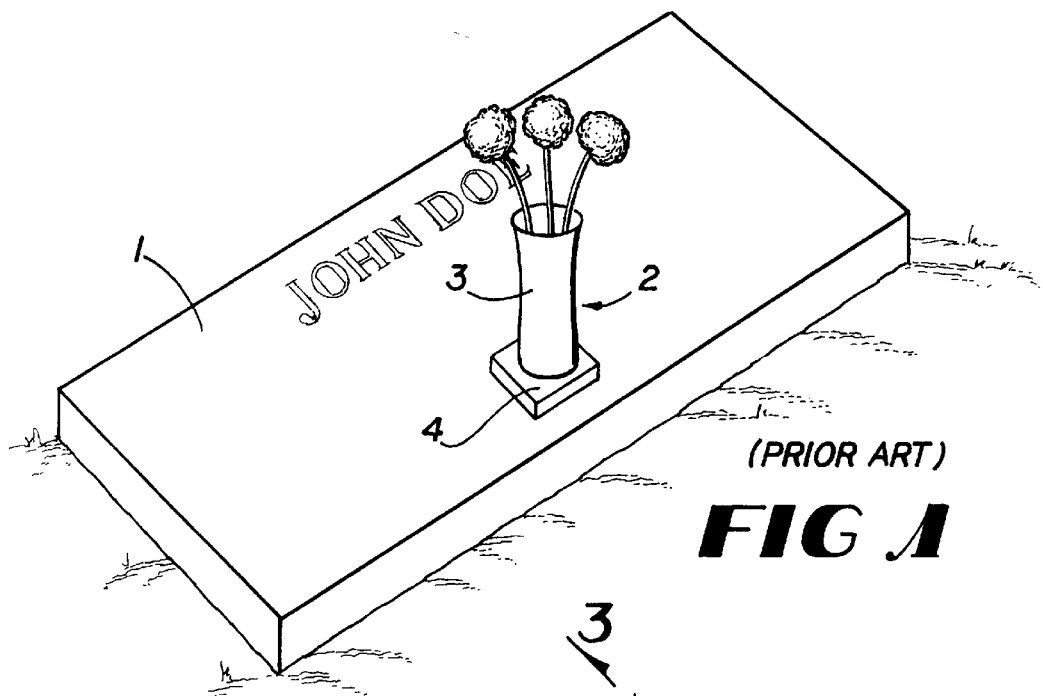
FIG. 1 shows an existing flower receptacle for a grave marker.
Figure 2:
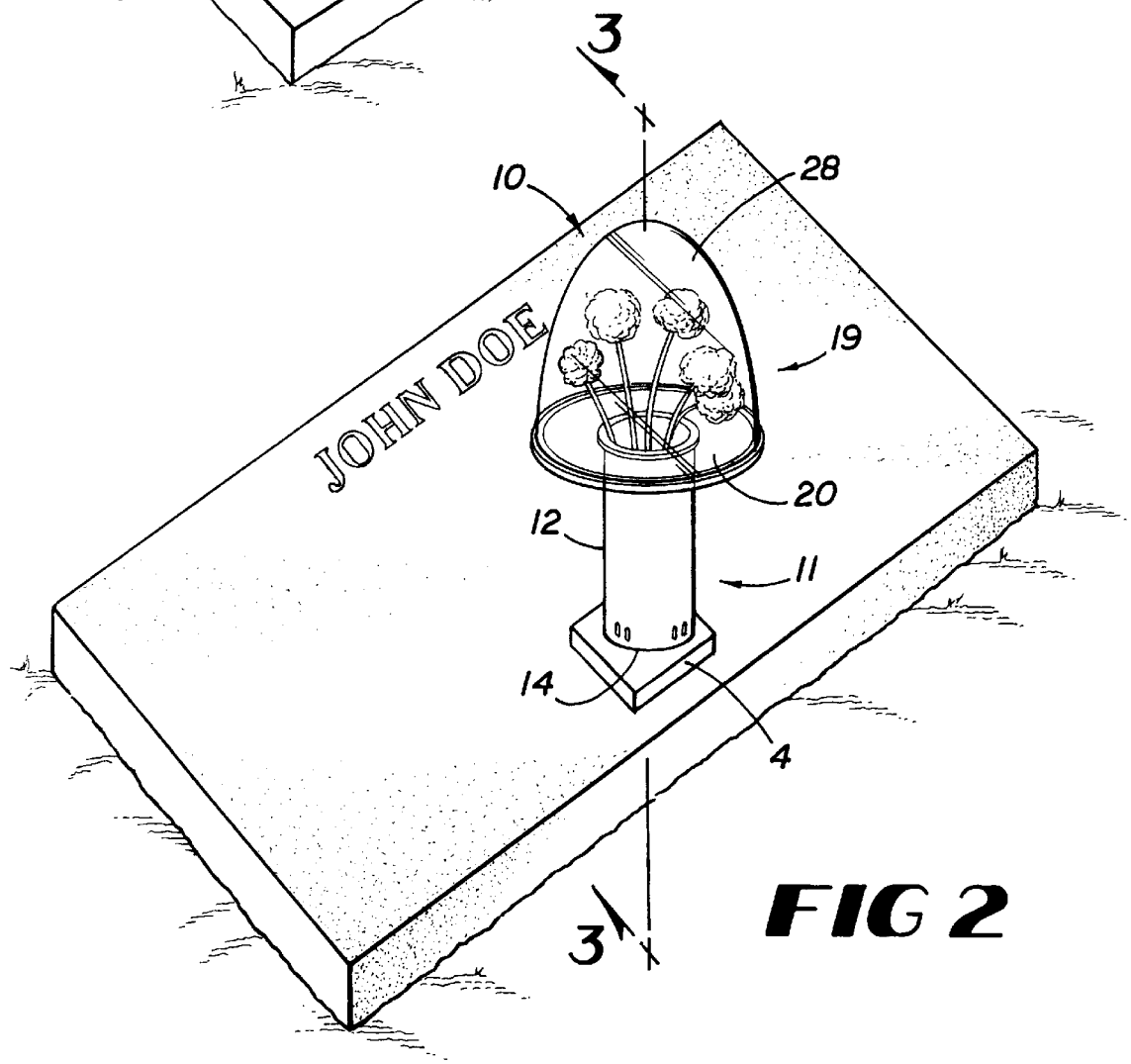
FIG. 2 is a perspective view of the device of the present invention in which the protective cover is connected to the receptacle on a grave marker to enclose and protect flowers placed therein.

Referring now in detail to the figures, the present invention shall be described with reference to FIGS. 2–4. The device, generally shown at 10, includes a lower portion 11 and an upper portion 19. The lower portion includes a base member 12. The base member 12 has two open ends 13 and 14 and a hole extending longitudinally therethrough between the open ends. The base member is preferably tubular in shape to conform to the generally tubular shape of the flower receptacle at the grave marker, but can also be any other suitable shape. It will be understood that the hole in the base member is of sufficient dimension such that the base member fits over the flower receptacle, as best shown in FIG. 3.

In use, the lower open end 14 of the base member 12 is placed over the flower receptacle and lowered downwardly over the receptacle 3. When lowered over the receptacle at a grave site, the lower open end 14 of the base member 12 preferably contacts the bottom 4 of the receptacle or the grave marker, if the receptacle has no bottom. The upper open end 13 of the base member preferably extends upwardly near the top edge of the receptacle. Although the present invention is shown in FIG. 3 such that the upper open end 13 is below the top edge of the receptacle, the device of the present invention may be of a dimension such that the upper open end of the base member extends above the top edge of the receptacle. The base member 12 also has a flange 16 extending outwardly from its upper end.

The base member 12 is preferably formed of 0.030 inch polyvinyl chloride (PVC) film or other suitable material. Slots 15 may be provided in the base member near the lower open end 15 to allow a tie strap to be inserted therethrough to help secure the base member to the flower receptacle.

The lower portion 11 of the present invention also includes a plate 20 having an aperture 22 preferably in the center of the plate. The plate 20 is preferably circular in shape, but can be any other suitable shape. The aperture 22 in the plate is slightly larger than the size of the upper open end 13 of the base member 12. The plate 20 is attached to the base member 12, as is best shown in FIG. 3, such that the aperture 22 corresponds to the hole in the base member. The connection between the plate 20 and the base member 12 is preferably accomplished by feeding the lower open end 14 of the base member through aperture 22 on the plate until the bottom side of the flange 16 of the base member contacts the top surface of the plate. The plate is then preferably cemented to the flange 16 of the base member, as shown in FIG. 3. Alternatively, the plate could be connected to the base member by connecting the bottom surface of the plate to the top side of the flange.

A plurality of ribs (not shown) may be provided on the bottom surface of the plate for strength and support. A plurality of slots 24 are provided around the periphery of the plate. Each slot is dimensioned to receive a corresponding tab extending from the cover, as will be described below. The plate also preferably has an upturned lip 26 extending upwardly from the periphery of the plate. Like the base member, the plate is also preferably made of 0.030 inch PVC film or other suitable material.

The upper portion 19 of the present invention includes a protective cover 28 that is removably connected to the plate 20 to enclose and protect the flowers or other objects placed in the receptacle. The cover 28 is preferably somewhat parabolic or hemispherical in shape, although the cover can also be square, triangular, or any other suitable shape. As best seen in FIG. 4, the bottom edge 29 of the cover is preferably circular such that the bottom edge 29 corresponds to the shape of the outer edge of the plate 20. A plurality of tabs 30 extend from the bottom edge 29 of the cover. The tabs 30 are located on the bottom edge of the cover in positions corresponding to the positions of slots 24 in the plate. To removably connect the cover to the plate, the cover is lowered onto the plate such that the tabs 30 extend through respective slots 24 in the plate. Also, when the cover is attached to the plate, the lip 26 on the outer edge of the plate helps to keep the cover in place by preventing lateral movement of the cover.

The cover is preferably made from 0.020 inch heavy duty PVC film or other suitable material. The cover is preferably clear, so that the flowers in the receptacle can be visible. The cover may also have vent holes or slots (not shown) formed therein to prevent the buildup of moisture and condensation on the cover.

FIGS. 5A–D show alternative embodiments of the present invention having different shapes for the protective cover 28. Therefore, those skilled in the art will appreciate that the present invention is not limited to a parabolic or hemispherical protective cover as described above, but can be utilized with any desired cover shape.

Therefore, the present invention disclosed herein provides a removable cover that protects flowers placed in receptacles at a grave marker from the elements and from cemetery maintenance personnel and machinery. The present invention therefore enhances the beauty of the grave site by protecting the flowers. By protecting the flowers in the grave marker receptacles, the present invention reduces the monetary expense of replacing damaged flowers and also reduces the time-consuming efforts of both cemetery personnel and visitors to dispose of damaged flowers and replace them with new ones.

While the invention has been described in connection with a preferred embodiment, this specification is not intended to limit the scope of the invention to the particular forms set forth, but, on the contrary, is intended to cover any such alternatives, modifications, and equivalents as may be included within the spirit and scope of the invention as defined by the appended claims.

What is claimed is:

1. A device for protecting items in a flower receptacle that is fixedly attached at or near a grave marker, comprising:
    a generally tubular base member that is open at both ends such that it has a hole extending therethrough from an upper end to a lower end, with said hole being slightly larger than the receptacle such that said base member can be placed around the receptacle;
    a generally circular plate member connected to the upper end of said base member and extending outwardly from the upper end of said base member, said plate member having an outer edge;
    a protective cover having a bottom edge that is removably connected to the plate member at the outer edge of the plate member for enclosing the items in the receptacle;
    a means for securing the base member to the receptacle.

2. The device of claim 1 wherein said means for securing includes slots in the base member to allow a strap to be inserted therethrough.

3. A device for protecting items in a flower receptacle that is fixedly attached at or near a grave marker, comprising:
    a lower portion dimensioned to fit around the receptacle, wherein said lower portion comprises a base member that is generally tubular and is open at both ends such that it has a hole extending therethrough from an upper end to a lower end, with said hole being slightly larger than the receptacle, said hole having a diameter, such that said base member can be placed around the receptacle;
    a circular solid plate having an opening in the center thereof, said opening defining an inner edge of said plate and having a diameter conforming essentially to the diameter of the hole in the base member of the lower tubular portion, wherein the inner edge of said plate is connected to said base member, and said plate having an outer edge having a diameter conforming essentially to the diameter of the bottom edge of an upper portion;
    wherein the bottom edge of the upper portion is removably connected to the outer edge of the plate for enclosing the items in the receptacle.

4. The device of claim 1 wherein said upper portion comprises a protective cover removably connected to the outer edge of said plate.

5. The device of claim 4 wherein said lower portion further comprises a flange extending outwardly from said upper end of said base member, and wherein said inner edge of said plate is corrected to said flange.

6. The device of claim 2 wherein said base member is made of plastic.

7. The device of claim 2 wherein said plate is made of plastic.

8. The device of claim 2 wherein said cover has a generally parabolic cross-section.

9. The device of claim 2 wherein said cover is generally hemispherical.

10. The device of claim 2 wherein said cover has vent holes therein to prevent the buildup of moisture within said cover.

11. The device of claim 2 wherein said plate has a plurality of slots around its outer edge, and wherein said bottom edge of said cover has a plurality of tabs that mate with said slots in said plate to removably connect said cover to said plate.

12. The device of claim 5 wherein said plate has an uptuned lip extending around its outer edge wherein said lip prevents lateral movement of said cover when said cover is connected to said plate.

13. The device of claim 2 wherein said cover is made of a clear material.

14. The device of claim 13 wherein said cover is made of plastic.

15. The device of claim 14 wherein said cover is made of polyvinyl chloride.

* * * * *